United States Patent Office 3,630,951
Patented Dec. 28, 1971

3,630,951
BUBBLE COMPOSITIONS
George P. Netherly, Afton Township, Washington County, Minn., assignor to Minnesota Mining and Manufacturing Company, St. Paul, Minn.
No Drawing. Filed Dec. 15, 1967, Ser. No. 690,747
Int. Cl. B01j 13/00
U.S. Cl. 252—307
4 Claims

ABSTRACT OF THE DISCLOSURE

Bubble compositions comprising water, a humectant and a water soluble bubble forming compound containing a fluoroaliphatic radical and a water solubilizing group which can be used to form long lasting large pendulous bubbles.

This invention relates to novel compositions for making long lasting large pendulous bubbles for use as air current tracers in ventilating systems and for play purposes.

The present invention provides novel bubble compositions which have been proven effective in forming bubbles as large as sixteen inches in diameter. The present bubble compositions display a remarkable effect in their ability to form large bubbles of exceptional strength and life, e.g., from twenty minutes to over four hours. In this respect, the novel compositions have been found to be especially useful in forming bubbles which can be "manipulated" as by inserting a soda straw through the bubble or forming other bubbles within a first bubble.

Thus, it is an object of the present invention to provide a bubble composition for forming large pendulous bubbles.

Another object of the invention is to provide novel bubble compositions that can be used to form exceptionally long lived bubbles.

A further object of the invention resides in the formation of strong bubbles which can be subsequently manipulated without rupturing the bubble.

Other objects and advantages of the invention will become more fully apparent from the following detailed description.

In accordance with the present invention, novel bubble compositions are formed from solutions containing therein as bubble forming agents one or more water soluble fluorocarbon compounds; said compositions are capable of forming large pendulous bubbles of exceptional strength and life when blown with air, helium, Freon, $CO_2$ or other suitable gaseous media. The fluorocarbon bubble formers of the present invention are compositions characterized by containing both a fluoroaliphatic radical and a water-solubilizing group, and may be represented generally by the structure $R_fZ$ where $R_f$ represents a saturated fluoroaliphatic radical usually containing at least 3 and less than 21 substantially fully fluorinated carbon atoms, preferably about 5 to 12. The fluoroaliphatic radical may be linear, branched or cyclic, preferably linear, and may contain an occasional carbon-bonded hydrogen or halogen (other than fluorine) atom, and may contain a divalent oxygen or sulfur atom or a trivalent nitrogen atom, bonded only to carbon atoms, in the skeletal chain.

Typical Z structures include

—$SO_2NRR'NR_3X$   —$CONRR'NR_3X$
—$SO_2NRR'CO_2M$   —$CONRR'CO_2M$
—$R'NR_3X$   —$SO_3M$
—$R'SO_3M$   —$CO_2M$
—$R'CO_2M$
—$CONRR'NR_2R'CO_2$   —$O(R'O)_mH$
—$R'PO(OM)_2$
—$R_2'PO(OM)_2$
—$R'OPO(OM)_2$ where
R is a lower alkyl radical containing up to 4 carbon atoms, or H;
R' is alkylene of 1–18 carbon atoms or polyoxyalkylene containing 2–200 carbon atoms;
X is an inorganic anion;
M is an inorganic cation or H, and
m is an integer from 1 to about 50.

The presently preferred water soluble fluorocarbon bubble formers of the present invention are represented by the formulae:

$$C_8F_{17}SO_2NHC_3H_6N(CH_3)_3I \quad (A)$$

and $$C_7F_{15}CONHC_3H_6N(CH_3)_2C_2H_4CO_2 \quad (B)$$

The above fluorocarbon compounds and mixtures thereof, when used in relatively small concentrations in water, are capable of forming stable solutions that are especially useful in forming large pendulous bubbles. The present fluorocarbons possess the necessary chemical stability which is essential for good film formation. Moreover, the above molecular structures possess extraordinary activity in reducing the surface tension of solutions even when they are present in very small concentrations.

The fluorocarbon film exhibits a great mobility and self-sealing ability and is thus capable of resealing the surface after it has been pierced.

The bubble forming compositions pertaining to this invention are prepared by forming a water solution containing the perfluoro compounds in concentrations of about 0.5 to about 5% by weight, depending on the particular compound used for this purpose. At higher concentrations, the solutions have a tendency to gel and become stratified. Preferably, the bubble forming compositions contain one or more of said fluorocarbon compounds in concentrations in the range of from about 0.75 to about 3% by weight of solution.

The compounds designated (A) and (B) have been found to be effective in their ability to form large pendulous bubbles with diameters as great as fifteen inches having a life of from about twenty minutes to one and one-half hours. Compounds (A) and (B) may be used in about 1.4% concentration to form bubbles of maximum stability.

Alternately, compounds (A) and (B) may be combined in a single solution in any relative amount up to about 4%, but, preferably, they form bubbles of maximum size, life and strength by using equal amounts of compounds (A) and (B) in a total concentration of about 1.5%, comprising 0.75% of (A) and 0.75% of (B) by weight of solution.

Improved stability and manipulatability of the present bubbles is obtained by means of additives which improve the film forming ability of the composition and the self-healing capacity of the bubbles themselves. An additive in the form of a water-soluble polymeric material combined with the perfluoro compounds before mixing with water will increase the stability of the bubbles. Additives which may be advantageously combined in solution involve the high molecular weight polymers of ethylene oxide, polyvinyl alcohol, polyglycols, carboxy vinyl polymer, etc. A polymer containing between 2000–4000 units of ethylene oxide has found to be a useful additive, imparting greater resistance to bubble disintegration. A polyethylene oxide polymer commercially available is the Polyox WSR–35 manufactured by the Union Carbide Chemical Co. Polyox WSR–35 is a polyethylene oxide with an average molecular weight of approximately 360,000; however, it has been found that molecular weights of about 80,000 to 500,000 are suitable. Additives of this type are included in the bubble composition in an amount in the range of from about 0.5% to 5% by weight of the final solution.

The quality of the bubbles blown may be further enhanced by the addition of low molecular weight highly hydratable compositions to decrease the rate of evaporation of water from the bubble surface. Typical of such humectants are ethylene glycol, diethylene glycol, glycerine, sorbitol, and the like. Glycerine, in the range of about 15 to 40% by weight of the final solution, is a preferred humectant.

A preferred bubble composition in accordance with the invention has the following composition by weight:

|  | Solution 1 | Solution 2 | Solution 3 |
|---|---|---|---|
| Formulation | Component (A), 0.7%<br>Component (B), 0.7%<br>Polyox WSR-35, 1.4%<br>Glycerine (USP), 25.0%<br>Water, 73.2% | Component (B), 1.4%<br>Polyox WSR-35, 1.4%<br>Glycerine (USP), 23.7%<br>Water, 73.5% | Component (A), 1.4%<br>Polyox WSR-35, 1.4%<br>Glycerine (USP), 23.7%<br>Water, 73.5%. |
| Maximum diameter | 16 inches | 15 inches | 15 inches. |
| Life | 1¼ to 4½ hours | 1½ hours | 22 minutes. |
| Perch | Easy | Easy | Easy. |
| Penetration straw | do | do | Do. |
| Penetration coin | All | Half-dollar | Penny. |

| Component: | Percentage |
|---|---|
| (A) | 0.7 |
| (B) | 0.7 |
| Polyox WSR-35 | 1.4 |
| Glycerine (USP) | 25.0 |
| Water | 72.2 |

Large pendulous bubbles having diameters ranging from 12 to 16 inches and lives exceeding four hours can be blown with the above solution.

The following preparative procedure is employed in producing bubble compositions of the present invention.

The equipment used is a standard reaction vessel fitted with agitator, facilities for heating and cooling, and with a bottom drain. Since the mixture tends to foam during agitation, the vessel should be at least 2 and preferably 4 times the volume of solution prepared.

To the clean vessel is added 8,000 lbs. of deionized (or distilled) water. The agitator is started and the kettle heated to 200° F. 175.5 lbs. of polyethylene oxide is added in small portions with continuous maximum agitation, avoiding too rapid addition which would cause slow solution. Agitation is continued for 1–2 hours until the oxide is completely and uniformly dispersed. The kettle contents are then cooled to 120° F. and glacial acetic acid added in small portions until the pH remains below 5.0, although preferably above 4.0. This normally requires 5 to 10 lbs. of acetic acid. With continuing agitation, 83.5 lbs. each of $$C_8F_{17}SO_2NHC_3H_6N(CH_3)_3I \quad (A)$$

and $$C_7F_{15}CONHC_3H_6N(CH_3)_2C_2H_4CO_2 \quad (B)$$

is added and agitation continued for 1 to 2 hours until solution is complete. 2,784 lbs. of glycerin is then added and agitation continued for another ½ hour to insure uniform solution. The kettle contents are then drained into suitable containers through a cartridge filter while warm; agitation can be discontinued during draining.

A portion of this solution was used to blow bubbles with a conventional bubble pipe. Bubbles having diameters as great as sixteen inches could be blown without difficulty. These bubbles had life spans ranging from one hour and fifteen minutes to four hours and thirty minutes.

In order to test the bubble forming ability of various formulations and the characteristics of the bubbles formed therewith, the following criteria were considered:

(1) The diameter of the largest bubble which could be blown with a bubble pipe.

(2) The life of a five inch diameter bubble perched on the rim of a drinking glass with an internal diameter of 2⅞ inches.

(3) The ability of a bubble to be perched on the glass. (Some bubbles perch readily; others require the rim of the glass to be moistened with the bubble solution; still others require the glass to be dry and clean; and some are very difficult to perch under any circumstances.)

(4) The toughness and healing ability of the bubble skin. This quality was measured in two ways:

(a) the ease with which a soda straw can be inserted through the bubble skin without bursting the bubble.
(b) the size of dry coin which can be dropped through the bubble without bursting the bubble. The coins used were, in the following order: dime, penny, nickel, quarter, half-dollar and dollar.

In contrast, a soap bubble solution made up of 5.4% sodium oleate, 0.4% gum arabic, 5.1% glycerine and 89.1% water (parts by weight) could only be used to blow bubbles having a maximum diameter of 10 inches with a life of approximately 30 seconds. Although bubbles blown with this solution could be easily perched on the rim of a drinking glass, the penetration tests could not be made because of the extremely short life span of the bubbles.

Efforts to increase the size or life span of the bubbles by increasing the glycerine content of the solution to approximately 25 weight percent proved fruitless. Although bubbles having a maximum diameter of 12 inches could be blown with such a solution, their life spans were unaffected. Significantly, bubbles blown with this solution could be perched on the rim of a drinking glass only with considerable difficulty.

The bubbles formed with the bubble compositions of the present invention, because of their high strength and long life characteristics, can be used as air current tracers in ventilating systems of large halls and the like. For such purposes, the bubbles would have diameters of about 3 to 5 inches so that they would be easily visible yet would not be so large that they would not effectively be carried by the air currents to the air exit points.

It will be seen that the present invention provides novel fluorocarbon-containing bubble solutions which make possible formation of large diameter bubbles having exceptional strength and self-healing characteristics as well as being extremely long-lived.

What is claimed is:

1. An aqueous bubble forming composition consisting essentially of water, about 15 to about 40 weight percent of a low molecular weight highly hydratable composition selected from the group consisting of ethylene glycol, diethylene glycol, glycerine and sorbitol and about 0.5 to about 5 weight percent of a water soluble bubble forming compound having the formula $$C_8F_{17}SO_2NH(CH_2)_2N(CH_3)_3I$$

said composition being capable of forming large pendulous bubbles having high strength and long life characteristics.

2. An aqueous bubble forming composition consisting essentially of water, about 15 to about 40 weight percent of a low molecular weight highly hydratable composition selected from the group consisting of ethylene glycol, diethylene glycol, glycerine and sorbitol and about 0.5 to about 5 weight percent of a water bubble forming compound having the formula $$C_7F_{15}CONHC_3H_6N(CH_3)_2C_2H_4CO_2$$

said composition being capable of forming large pendulous bubbles having high strength and long life characteristics.

3. An aqueous bubble forming composition consisting essentially of water, about 15 to about 40 weight percent of a low molecular weight highly hydratable composition selected from the group consisting of ethylene glycol, diethylene glycol, glycerine and sorbitol and about 0.5 to about 5 weight percent of a water soluble bubble forming compound which is a mixture of $C_8F_{17}SO_2NH(CH_2)_3N(CH_3)_3I$ and $C_7F_{15}CONHC_3H_6N(CH_3)_2C_2H_4CO_2$, said composition being capable of forming large pendulous bubbles having high strength and long life characteristics.

4. A large pendulous bubble having a life span of from about twenty minutes to about four hours, said bubble having a shell comprising a film of a water soluble compound which is a mixture of $C_8F_{17}SO_2NH(CH_2)_3N(CH_3)_3I$ and $C_7F_{15}CONHC_3H_6N(CH_3)_2C_2H_4CO_2$, a low molecular weight highly hydratable composition selected from the group consisting of ethylene glycol, diethylene glycol, glycerine and sorbitol and water, said shell being highly mobile and self-sealing.

References Cited

UNITED STATES PATENTS

| | | | |
|---|---|---|---|
| 2,433,625 | 12/1947 | Raspet | 252—307 |
| 2,469,045 | 5/1949 | La Vietes | 252—307 |
| 2,764,602 | 9/1956 | Ahlbrecht | 260—501.13 |
| 2,797,139 | 6/1957 | Veatch | 252—307 |
| 3,258,423 | 6/1966 | Tuve et al. | 252—8 |

LEON D. ROSDOL, Primary Examiner

W. E. SCHULZ, Assistant Examiner

U.S. Cl. X.R.

46—6; 252—354